United States Patent
Sato

(10) Patent No.: US 9,331,789 B2
(45) Date of Patent: May 3, 2016

(54) TRANSMITTER OPTICAL MODULE IMPLEMENTED WITH THERMO-ELECTRIC CONTROLLER

(71) Applicant: Sumitomo Electric Industries, Ltd., Osaka-shi (JP)

(72) Inventor: Shunsuke Sato, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 210 days.

(21) Appl. No.: 14/075,876

(22) Filed: Nov. 8, 2013

(65) Prior Publication Data

US 2014/0126918 A1    May 8, 2014

(30) Foreign Application Priority Data

Nov. 8, 2012 (JP) ................................. 2012-245959

(51) Int. Cl.
*H04B 10/06* (2006.01)
*H04B 10/50* (2013.01)
*G02B 6/42* (2006.01)

(52) U.S. Cl.
CPC .............. *H04B 10/50* (2013.01); *G02B 6/4271* (2013.01); *G02B 6/4215* (2013.01); *G02B 6/4292* (2013.01)

(58) Field of Classification Search
CPC .............. G02B 6/00; G02B 6/36; G02B 6/42; G02F 1/09; H04B 10/50; H04J 14/02
USPC .............. 398/182, 91, 79; 385/93, 92, 88, 24; 257/696, 458, 225; 250/214.1
See application file for complete search history.

(56) References Cited

U.S. PATENT DOCUMENTS

| | | | | |
|---|---|---|---|---|
| 5,438,444 A * | 8/1995 | Tayonaka | ................ | H04J 14/02 385/24 |
| 5,526,175 A * | 6/1996 | Minelly | .............. | H01S 3/10023 359/337.21 |
| 6,339,495 B1 * | 1/2002 | Cowle | ................. | H04B 10/296 359/337.1 |
| 6,349,106 B1 * | 2/2002 | Coldren | ................ | B82Y 20/00 372/26 |
| 6,396,801 B1 * | 5/2002 | Upton | .................. | H04J 14/005 370/204 |
| 6,480,318 B2 * | 11/2002 | Mori | ................. | H04B 10/0731 356/73.1 |
| 6,545,799 B1 * | 4/2003 | McNamara | ......... | H04J 14/0221 359/337.11 |
| 6,636,662 B1 * | 10/2003 | Thompson | ......... | G02B 6/12011 385/132 |
| 6,639,716 B1 * | 10/2003 | Tomofuji | ............. | H01S 3/1301 359/337.12 |
| 6,680,791 B2 * | 1/2004 | Demir | ................... | B82Y 20/00 359/245 |
| 6,768,827 B2 * | 7/2004 | Yoo | ........................ | B82Y 20/00 385/14 |
| 6,821,030 B2 * | 11/2004 | Fukuda et al. | .................. | 385/92 |
| 7,031,617 B2 * | 4/2006 | Zucchelli | ............. | G02F 1/3517 398/175 |
| 7,046,434 B1 * | 5/2006 | DiJaili | .............. | H04Q 11/0005 359/344 |
| 7,106,978 B2 | 9/2006 | Nasu et al. | | |
| 7,715,093 B2 * | 5/2010 | Nishihara | ........... | H01S 3/06754 359/337.1 |
| 7,911,315 B2 * | 3/2011 | Bradley | ........................... | 338/2 |
| 7,990,608 B2 * | 8/2011 | Takeyama | ........... | H01S 3/06758 359/337.11 |

(Continued)

*Primary Examiner* — Ken N Vanderpuye
*Assistant Examiner* — Abbas H Alagheband
(74) *Attorney, Agent, or Firm* — Venable LLP; Michael A. Sartori; Trent B. Ostler

(57) ABSTRACT

A transmitter optical module is disclosed. The optical module includes a plurality of LDs each emitting light with specific wavelengths different from others, a TEC including a post in bottom plate thereof through which currents to driver the TEC is supplied, and a body portion including an electrical plug made of multi-layered ceramics. The multi-layered ceramic in a lowermost ceramic layer thereof provides electrical pads to supply current to the TEC through the post. The post and the pads are configured in side-by-side arrangement such that the post in the TEC is put between two pads in the lowermost ceramic layer.

13 Claims, 9 Drawing Sheets

(56) References Cited

U.S. PATENT DOCUMENTS

| | | | |
|---|---|---|---|
| 8,213,472 B2 | 7/2012 | Hirai et al. | |
| 8,368,192 B1* | 2/2013 | Chen | 257/676 |
| 8,380,073 B2* | 2/2013 | Edwards et al. | 398/135 |
| 8,553,318 B2* | 10/2013 | Takeyama | H01S 3/06754 359/337.1 |
| 8,737,440 B2* | 5/2014 | Watanabe et al. | 372/34 |
| 8,908,726 B2* | 12/2014 | Firth et al. | 372/34 |
| 2001/0030787 A1* | 10/2001 | Tajima | H04J 14/0221 398/82 |
| 2002/0159117 A1* | 10/2002 | Nakajima | H04J 14/0212 398/83 |
| 2003/0095737 A1* | 5/2003 | Welch | B82Y 20/00 385/14 |
| 2003/0133641 A1* | 7/2003 | Yoo | B82Y 20/00 385/14 |
| 2003/0156789 A1* | 8/2003 | Bhardwaj | G02B 6/12 385/37 |
| 2003/0223672 A1* | 12/2003 | Joyner | G02B 6/12011 385/14 |
| 2004/0033004 A1* | 2/2004 | Welch | B82Y 20/00 385/14 |
| 2004/0126057 A1* | 7/2004 | Yoo | B82Y 20/00 385/16 |
| 2005/0053377 A1* | 3/2005 | Yoo | H04B 10/299 398/79 |
| 2005/0089269 A1* | 4/2005 | Cheng | G02B 6/12019 385/27 |
| 2005/0089273 A1* | 4/2005 | Squires | G02B 6/12019 385/37 |
| 2006/0203329 A1* | 9/2006 | Nishihara | H01S 3/06754 359/337 |
| 2006/0215545 A1* | 9/2006 | Nelson | 370/216 |
| 2007/0065076 A1* | 3/2007 | Grek | G02B 6/12026 385/37 |
| 2008/0013881 A1* | 1/2008 | Welch | G02B 6/12004 385/14 |
| 2008/0138088 A1* | 6/2008 | Welch | H01S 5/026 398/183 |
| 2008/0239470 A1* | 10/2008 | Nishihara | H01S 3/06754 359/337.1 |
| 2009/0185804 A1* | 7/2009 | Kai | H04J 14/0226 398/48 |
| 2011/0062312 A1* | 3/2011 | Hosking et al. | 250/214 A |
| 2011/0142086 A1* | 6/2011 | Watanabe et al. | 372/34 |
| 2011/0200333 A1* | 8/2011 | Schrenk | H04B 10/2587 398/67 |
| 2011/0228381 A1* | 9/2011 | Takeyama | H01S 3/06754 359/337.1 |
| 2012/0045183 A1* | 2/2012 | Fujimura et al. | 385/93 |
| 2013/0114629 A1* | 5/2013 | Firth et al. | 372/20 |
| 2013/0279862 A1* | 10/2013 | Ishii et al. | 385/92 |
| 2014/0072005 A1* | 3/2014 | Watanabe et al. | 372/34 |
| 2015/0010307 A1* | 1/2015 | Zhong | H04J 14/0246 398/68 |

* cited by examiner

TRANSMITTER OPTICAL MODULE IMPLEMENTED WITH THERMO-ELECTRIC CONTROLLER

BACKGROUND

1. Field

The present application relates to a transmitter optical module that installs a thermo-electric controller (hereafter denoted as TEC) therein.

2. Description of the Related Art

A transmitter optical module has been used as an optical signal source for the optical communication system, and/or a pumping source for an optical fiber amplifier. The transmitter optical module installs therein a semiconductor laser diode (hereafter denoted as LD) to convert an electrical signal into an optical signal. Because an emission wavelength of the LD strongly depends on an operating temperature of the LD, the transmitter optical module is often implemented with a TEC to keep a temperature of an LD constant. The U.S. Pat. No. 6,821,030, U.S. Pat. No. 7,106,978, and U.S. Pat. No. 8,213,472, have been disclosed such an transmitter optical module installing a TEC therein.

The present application is to provide an improved arrangement to supply current to a TEC installed within the transmitter optical module.

SUMMARY

A transmitter optical module according to one of embodiments comprises a plurality of LDs, a TEC, and a body portion enclosing the LDs and the TEC therein. The TEC includes a bottom plate on which posts to supply current to the TEC is provided. The body portion includes an electrical plug made of multi-layered ceramics. The multi-layered ceramics provides pads through which the current to drive the TEC is supplied. A feature of the transmitter optical module is that the pads in the multi-layered ceramics and the posts in the bottom plate of the TEC are arranged in side-by-side such that the pads put the posts therebetween; and are connected to the posts via bonding wires.

One of embodiments includes a lowermost ceramic layer and a first ceramic layer provided on the lowermost ceramic layer. The pads are formed on the top surface of the lowermost ceramic layer. The first ceramic layer provides interconnections on the top surface and the back surface thereof. The pads on the lowermost ceramic layer are electrically connected to the interconnections formed in the back surface of the first ceramic layer and brought to the outside of the body portion. The bottom plate of the TEC is slipped under the lowermost ceramic layer; while, the first ceramic layer exposes top surface of the lowermost ceramic layer only in both sides thereof. Thus, the pads formed in the exposed top surface of the lowermost ceramic layer puts the posts in the bottom plate of the TEC therebetween.

BRIEF DESCRIPTION OF THE DRAWINGS

Non-limiting and non-exhaustive embodiments will be described with reference to the following figures.

DETAILED DESCRIPTION

Some embodiments will be described as referring to drawings. A transmitter optical module shown in FIGS. 1 to 3 includes a plurality of LDs within a package, and each of LDs emits light with a specific wavelength different from others. Such a transmitter optical module is installed in an optical transceiver applicable to the wavelength division multiplexing (WDM) system.

Figure 1:
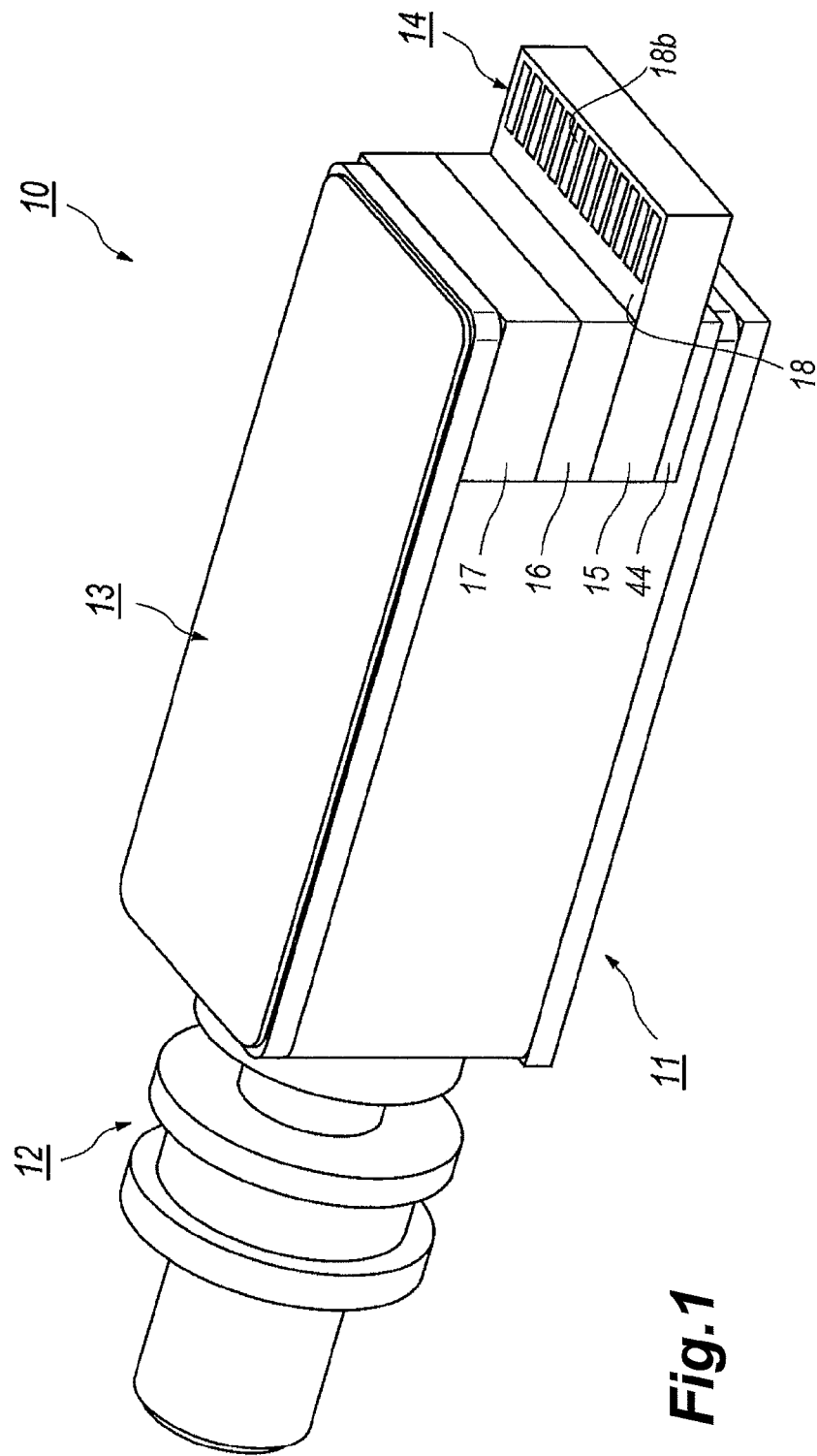
FIG. 1 shows an outer appearance of a transmitter optical module according to an embodiment.

FIG. 1 shows an outer appearance of the transmitter optical module 10 according to an embodiment. The transmitter optical module 10 shown in the figures primarily comprises a body portion 11 and a coupling portion 12. The body portion 11 has a box shape with a ceiling 13 to seal an inside thereof hermetically. A rear end of the body portion 11 provides an electrical plug to communicate with an external circuit electrically. The coupling portion 12 is assembled with one wall of the body portion 11 in a side opposite to the electrical plug 14. The description below assumes only for the explanation sake that the front side of the module 10 corresponds to a side where the coupling portion 12 is provided; while, the rear is a side the electrical plug 14 is formed.

Figure 2:
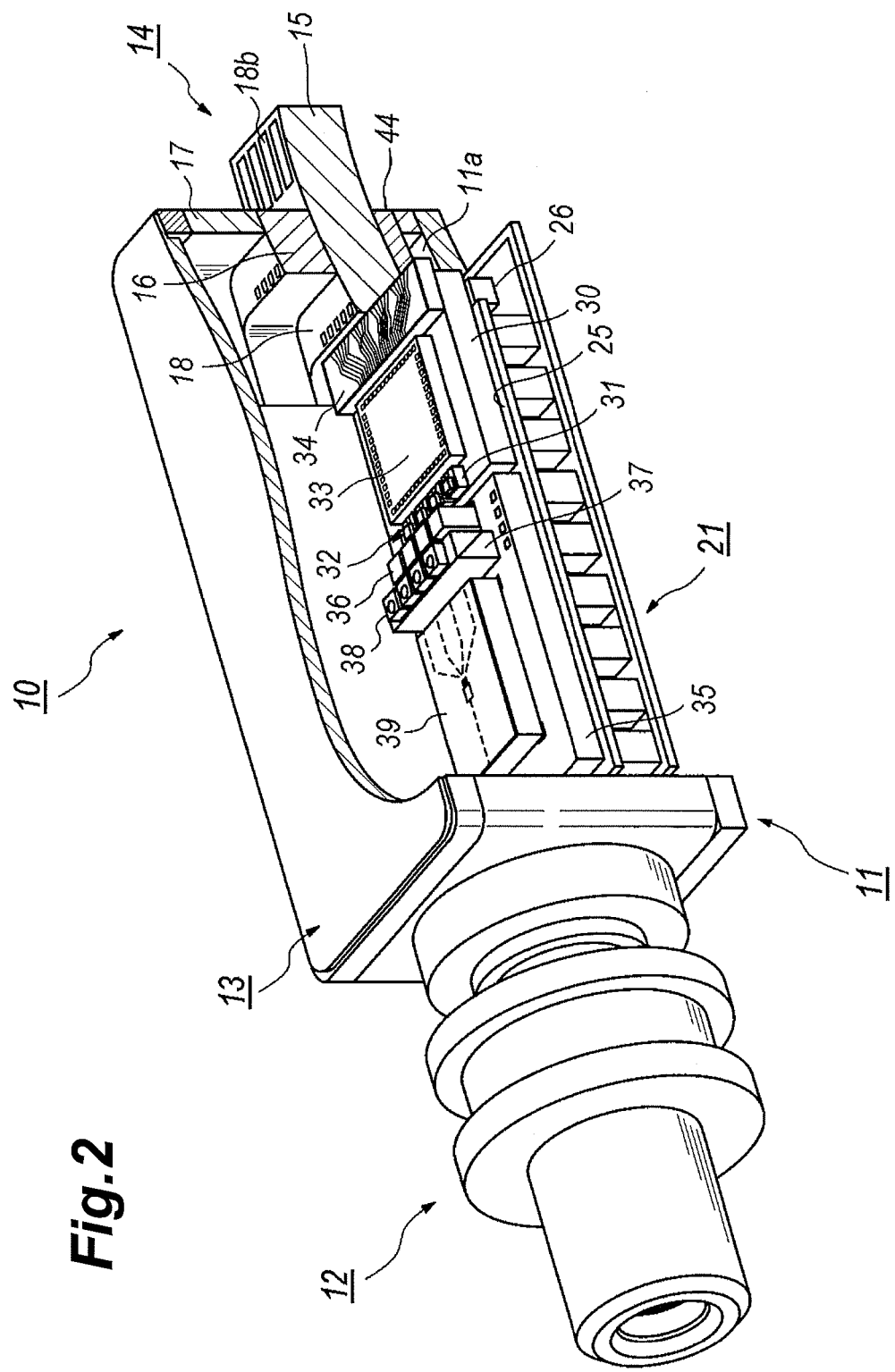
FIG. 2 shows an inside of the transmitter optical module illustrated in FIG. 1.
Figure 3:
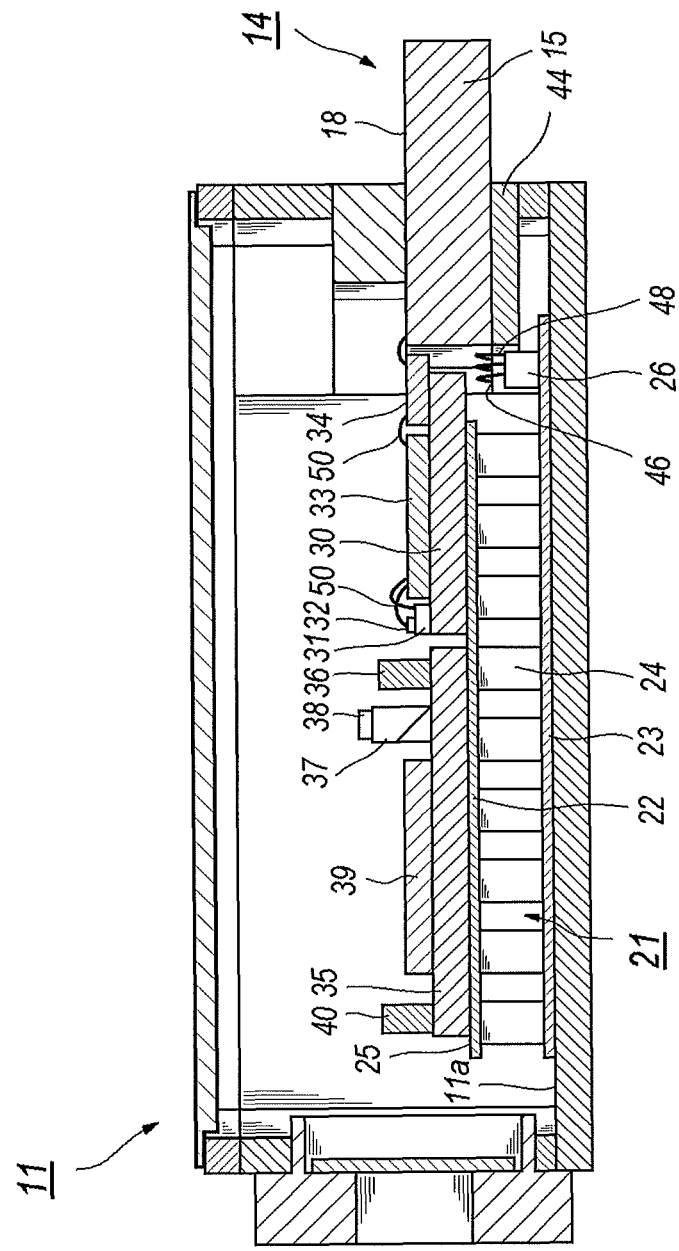
FIG. 3 shows a side cross section of the transmitter optical module illustrated in FIGS. 1 and 2.

FIG. 2 is also a perspective drawing of the optical module viewed from the front top, where a part of the body portion 11 is removed to show the inside thereof. FIG. 3 is a cross section along the longitudinal direction of the body portion 11 of the optical module 10. The body portion 11 installs a TEC 21, the LDs 32, a driver 33, and some optical components therein. The LDs 32 and the driver 33 are mounted on the TEC 21 through the first carrier 30; while, the optical components such as first lenses 36, monitor photodiodes (hereafter denoted as PD) 38, an optical multiplexer 39, and the second lens 40 are mounted on the TEC 21 through the second carrier 35. Further specifically, the LDs 32 are mounted on the first carrier via LD sub-mounts 31; while, the monitor PDs 38 are mounted on the second carrier 35 via a beam splitter 37. The first carrier 30 also mounts a wiring substrate 34 thereon. Two carriers, 30 and 35, are preferably made of material having good thermal conductivity, such as aluminum nitride (AlN), copper tungsten (CuW), and so on.

Each of LDs 32 emits light with a specific wavelength different from others. The optical multiplexer 39 multiplexes light depending on the wavelengths thereof to generate a single beam to be coupled with a single fiber through the second lens 40. The embodiment shown in the figures installs four (4) LDs; and the wavelengths of light emitted from the LDs 32 follow the LAN-WDM standard where a wavelength difference to the next grid is defined to be around 5 nm. The body portion 11, as already explained, has a box shape with 5 to 8 mm square. The coupling portion 12, which receives an external ferrule secured in a tip of an external fiber, couples the LDs in the body portion 11 optically with the external fiber. The electrical plug 14, which extends outwardly, is made of multi-layered ceramics; where the embodiment shown in the figures has four ceramic layers, 15 to 17, and 44.

The first ceramic layer 15 in the electrical plug 14 includes a top surface 18, on which electrical pads 18b are formed, and a back surface 20 where other electrical pads may be formed but not explicitly illustrated in the figures. The electrical plug 14 is electrically connected to external circuits with, for instance, a flexible printed circuit (FPC) board, and/or electrical connectors with lead terminals in contact with the pad 18b.

The driver 33 mounted on the first carrier 30 is electrically connected to the wiring substrate 34 and the LDs 32 with bonding wires 50. The wiring substrate 34 provides interconnection with an arrangement of the micro-strip line and/or the coplanar line to secure the transmission impedance thereof. Because the driver 33, or the LDs 32, operates in a speed reaching, or occasionally exceeding, 10 Gbps; the impedance matching of the transmission lines to that of the driver 33 and the LDs 32 are one of key factors to maintain the signal quality. The interconnections on the wiring substrate 34 suppress the degradation of the signal quality due to not only the impedance mismatching but elongated bonding wires.

The transmitter optical module 10 of the embodiment further provides an arrangement to suppress the degradation of the signal; that is, the top level of the wiring substrate 34, that of the first ceramic layer 18 where the interconnections from the pads 18b are formed, and that of the driver 33 are substantially leveled; which further shortens a length of the bonding wire.

In a transmitter optical module applied to the wavelength division multiplexing (WDM) system, the precise control of an operating temperature of an LD is inevitable because an LD inherently shows large temperature dependence of performances thereof. For instance, the emission wavelength, the emission efficiency, and so on strongly depend on an operating temperature. The transmitter optical module 10 of the present embodiment installs a TEC with a large size to control a temperature of not only the LDs 32 but the driver 33, and the optical multiplexer 39. The TEC 21 is mounted on the bottom 11a of the body portion 11.

The first and second carriers, 30 and 35, of the embodiment are disposed on the top plate 22 of the TEC 21 in front and rear of the body portion 11. Although the LDs 32 is mounted on respective LD sub-mounts 31 in the present embodiment, the LD sub-mounts 31 may be integrally formed in a single body. The first carrier 30, or the LD sub-mount 31, mounts a temperature sensor to detect the temperature of the LDs 32, or that of the driver 33 to set the temperature of the devices, 32 or 33, in a preset condition.

The driver 33 integrates a plurality of LD drivers each driving respective LDs 32 independently. The driver 33 may also integrate an automatic power control (APC) circuit to keep an average output power of the LD 32 in constant by feeding the output of the monitor PD 33 back to the APC circuit. The driver 33 may integrate four (4) APC circuits each operating for respective LDs 32. The LDs 32 receive driving signals from the driver 33 via bonding wires 50.

The second carrier 35 mounts optical components, namely, the first lenses 36, the monitor PDs 38, the optical multiplexer 39 and the second lens 40. The first lenses 36 are placed in front of the respective LDs 32 in an arrayed arrangement to concentrate light beams emitted from the respective LDs 32. The concentrated beams enter the beam splitter 37 on which the monitor PDs 38 are mounted. The beam splitter 37 transmits a portion of the concentrated beams, the primary portion thereof, toward the optical multiplexer 39; while, reflects a rest portion of the concentrated beams toward the monitor PDs 38. The rest portion of the beam is 1 to 10% of the concentrated beam. The monitor PDs 38, which are mounted on the beam splitter 37, receive thus divided rest portion of the concentrated beams, and generate photocurrents. The photocurrents are fed back to the APC circuits so as to maintain the output power of respective LDs 32 in constant.

Next, the arrangements around the TEC 21 will be described in detail. The TEC 21 includes a top plate 22, a bottom plate 23, and a plurality of Peltier elements 24 provided between two plates, 22 and 23. The bottom plate 23 faces and comes in physical contact with the bottom 11a of the body portion 11, while, the top surface 25 of the top plate 22 mounts optical and electrical components thereon through carriers, 30 and 35. The top plate 22 extends rearward to just in front of the first ceramic layer 15 in the electrical plug 14. Moreover, the level of the top surface 25 is set between the top surface 18 of first ceramic layer 15 and the top surface 45 of the fourth ceramic layer 44.

The bottom plate 23 of the TEC 22 slips under the first and fourth ceramic layers, 15 and 44, in the rear end thereof. A portion of the bottom plate 23 not covered by the top plate 22 provides posts 26 arranged in side by side with respect to the longitudinal direction of the body portion 11. The posts 26 have a rectangular cross section in the present embodiment, but, a pillared shape with a circular cross section is applicable. The posts 26 in a top thereof are electrically connected to the pads in the top surface 45 of the fourth ceramic layer 44.

Figure 4:
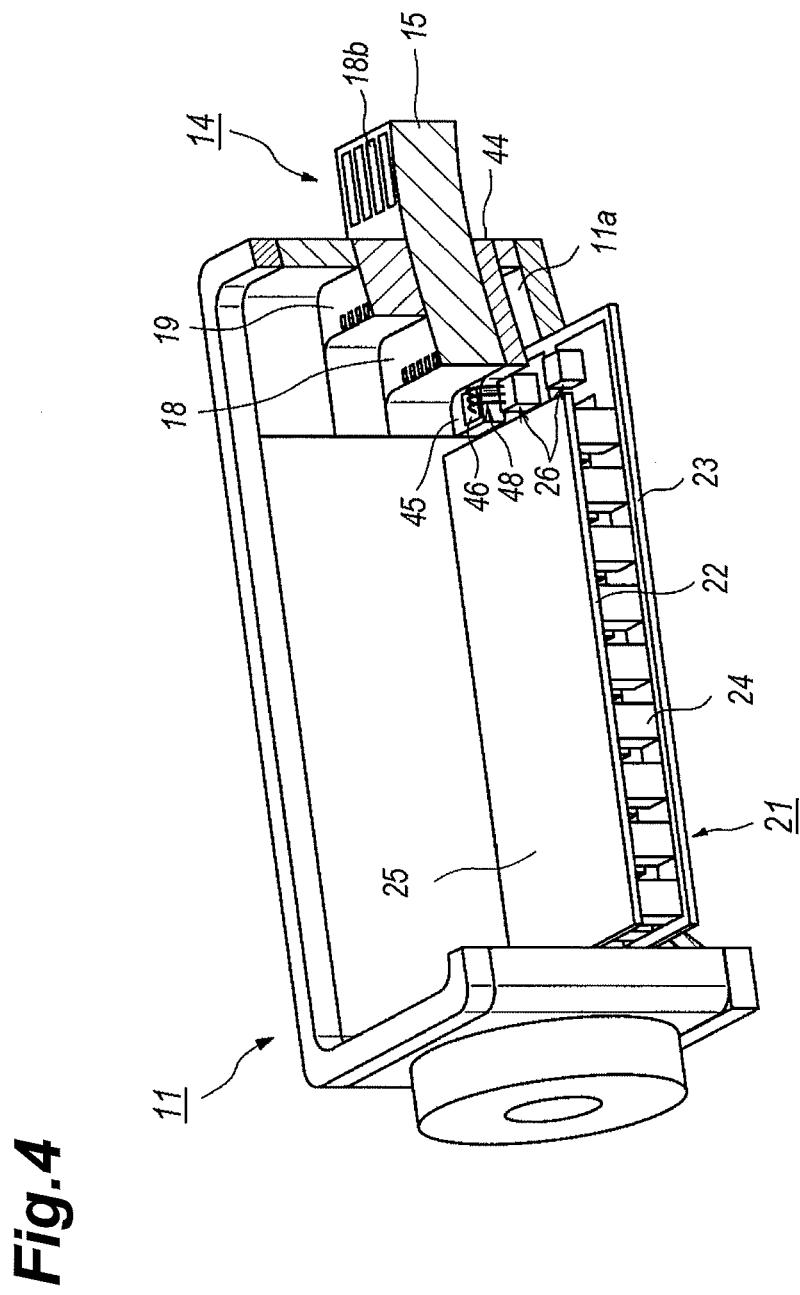
FIG. 4 illustrates a TEC with a post and a lowermost ceramic layer with a pad disposed in side-by-side arrangement to the post.
Figure 5:
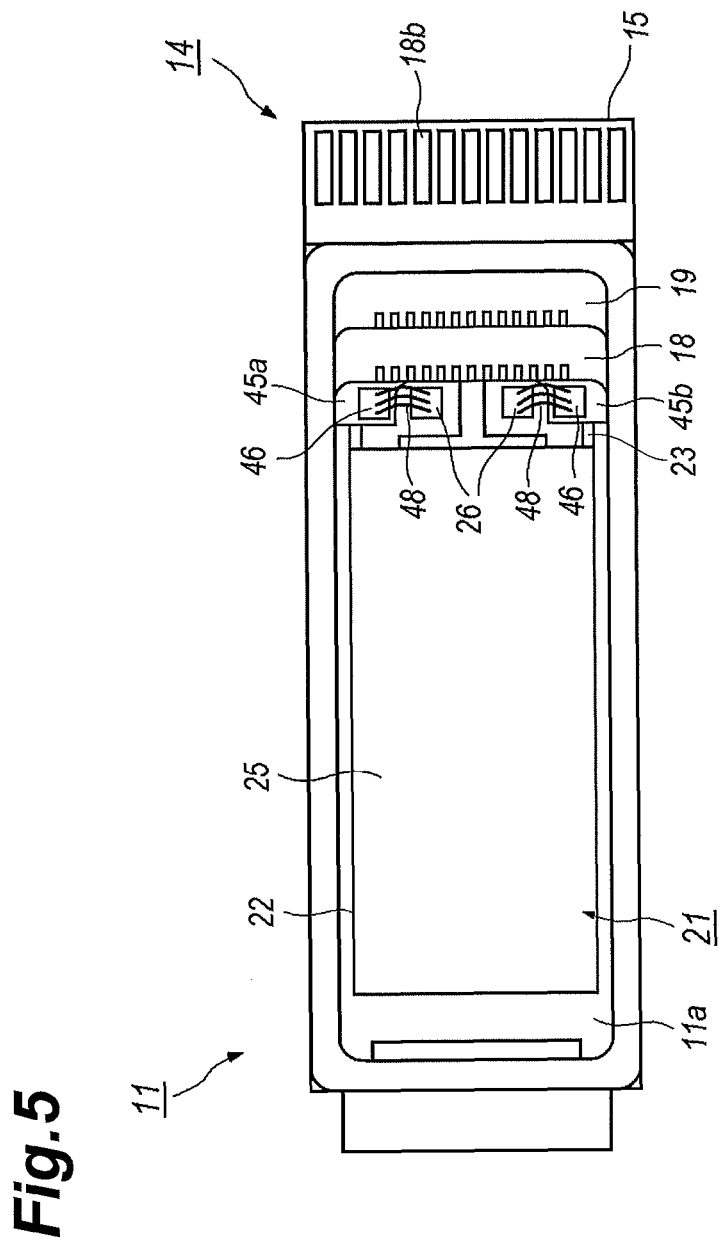
FIG. 5 is a plan view showing the post, the pad and bonding wires electrically connecting the pad to the post.
Figure 6:
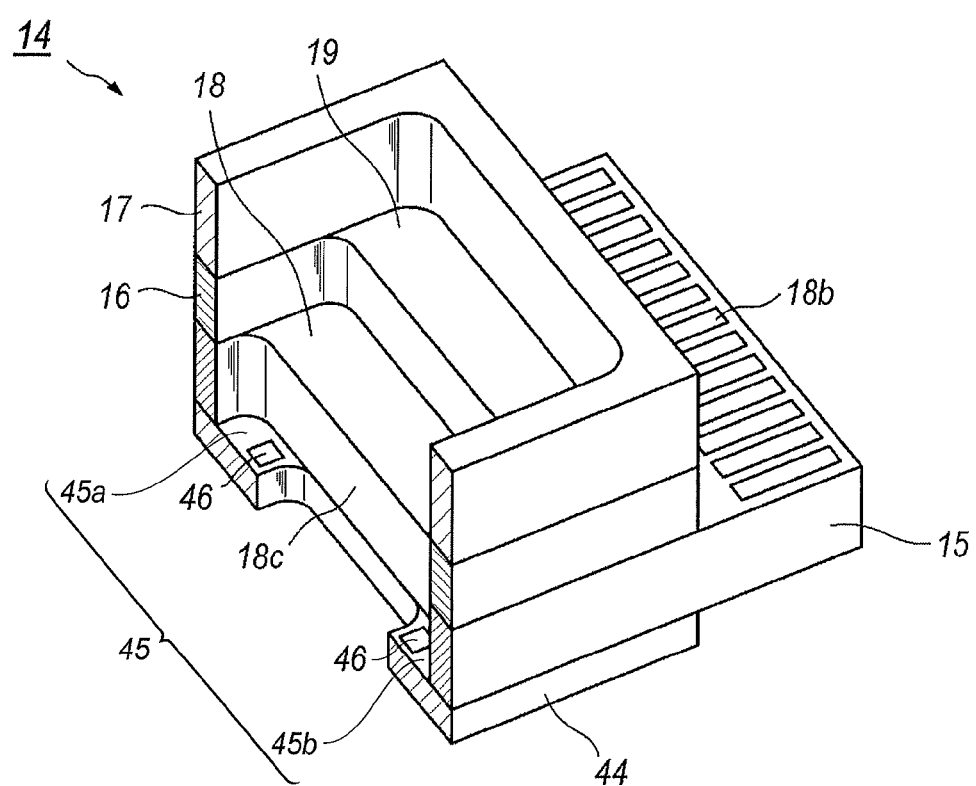
FIG. 6 magnifies a rear portion of the multi-layered ceramics providing the pad in the top surface of the lowermost layer thereof.

FIG. 4 is a perspective view of the TEC 21 set within the body portion 11; FIG. 5 is a plan view; and FIG. 6 magnifies a rear end of the body portion 11 to show an arrangement around the TEC 21. Referring to FIG. 6, the electrical plug 14 includes first to fourth ceramic layers, 15 to 17 and 44, where the fourth ceramic layer 44 is the lowermost layer, while, the third ceramic layer 17 is the topmost layer in the present embodiment. Although the embodiment provides four ceramic layers, the body portion 11 may be formed by five or more ceramic layers.

The first ceramic layer 15 extends externally and internally to form a terrace where the external pads 18b, internal pads, and interconnections electrically connecting them are provided. The latter two elements, namely, the internal pads and the interconnections are not explicitly illustrated in the figure. The inner edge 18c of the top surface 18 in respective sides thereof is back off to expose the top surface 45 of the fourth ceramic layer 44 to form exposed areas 45a and 45b of the lowermost layers 44.

The second ceramic layer 16, which is put on the first ceramic layer 15, provides a top surface 19 exposed inside of the body portion 11. The top surface 19 in a front edge thereof is back off to expose the top surface 18 of the first ceramic layer 15. The top surface 19 of the second ceramic layer also forms interconnection electrically connected to the driver 33. Because the top surface 19 is not extended outside of the body portion 11, via holes piercing the second ceramic layer 16 electrically connect the interconnections on the top surface 19 to those formed on the top surface 18 of the first ceramic layer 15. Thus, the interconnections provided on the top surface 19 are preferably provided for signals containing lower frequencies.

The third ceramic layer 17, which is put on the second ceramic layer 16, is configured to be a wall to form a cavity within the body portion 11. The third ceramic layer 17 exposes the top surface 19 of the second ceramic layer 16.

While, the fourth ceramic layer 44 is provided under the first ceramic layer 15 and provides the top surface 45 exposed within the inside of the body portion 11 and respective sides thereof.

The top surface 45 provides an electrical pads 46 on the exposed areas 45a and 45b. Because the top surface 45 of the fourth ceramic layer 44 is exposed only in respective sides of the body portion 11 to form the exposed areas 45a and 45b of the top surface 45, the bottom plate 23 of the TEC 21 may be extended between the exposed areas 45a and 45b of the top surface 45. That is, the rear end of the bottom plate 23 is set in a cut between the exposed areas 45a and 45b of the top surface 45. Moreover, the rear portion of the bottom plate 23 provides the posts 26 to supply a current to the TEC 21. Accordingly, the posts 26 on the bottom plate 23 and the electrical pads 46 on the top surface 45 are arranged in side-by-side. Connecting the electrical pad 46 to the post 26 with bonding wires 48, the current to drive the TEC 21 is supplied. This arrangement of two electrodes, 26 and 46, are suitable for drawing a plurality of bonding wires 48 with a shorter length. Moreover, the side-by-side arrangement of the electrodes may be formed only by stacking the ceramic layers, 44 and 15, without cutting, processing, and so on of the ceramic material.

The electrical pad 46 is connected to the pad 18b prepared in the plug 14 by a via hole piercing the first ceramic layer 15. When the electrical pad 46 is connected to another pad formed in the back surface of the first ceramic layer 15, which is not illustrated in the figures, the electrical pad 46 is directly connected to those pads without passing any via holes. As shown in the figures, the bonding wires 48 connecting two pads 46 with the posts 26, extend laterally of the body portion 11 and with a relatively shorter length.

Figure 7:
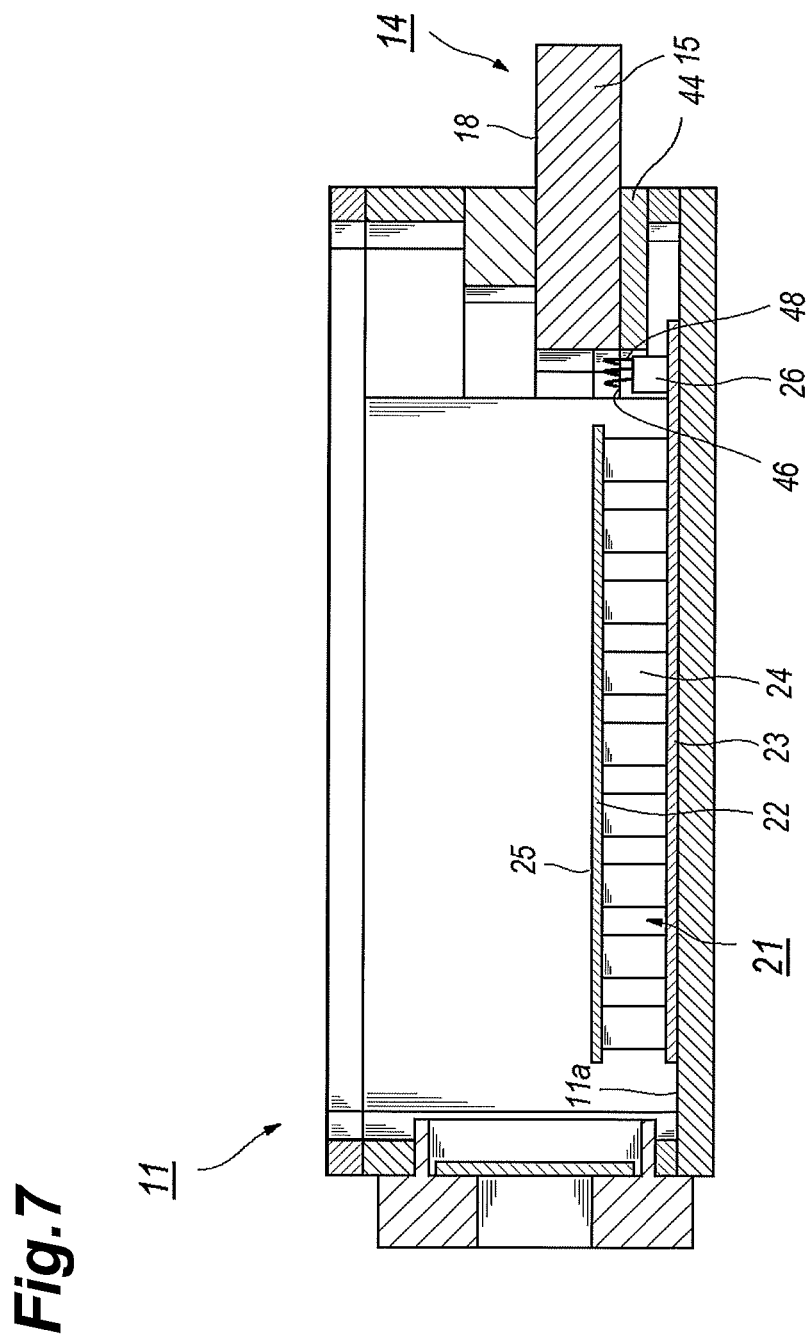
FIG. 7 shows a side cross section of the TEC with the post, the multi-layered ceramics with the pad on a top surface of the lowermost layer.

FIG. 7 shows a side cross section of the TEC 21 showing a positional relation of the TEC 21, the first and fourth ceramic layers, 15 and 44, and the bonding wires 48. As shown in FIG. 7, the bonding wires 48 in a top level thereof is lowered from the top surface 25 of the TEC 21. Accordingly, the top surface 45 of the fourth ceramic layer 44 and the top of the post 26 are set in a level lowered from the top surface 25 of the TEC 21. Accordingly, even when the first carrier 30 extrudes from the edge of the top plate 22 of the TEC 21 rearward, the first carrier 30 does not interfere with the bonding wires 48.

As shown in FIG. 3, the wiring substrate 34 also protrudes rearward from the edge of the first carrier 30 so as to set the rear edge of the wiring substrate 34 further close to the front edge of the first ceramic layer 15. This arrangement enables to connect the interconnection on the top surface 18 of the first ceramic layer 15 with the interconnection on the wiring substrate with a shorter bonding wire. Because the position of the LDs 32 measured from the front wall of the body portion is optically determined, and the driver 33 has definite planar dimensions, the rear edge of the driver 33 is sometimes apart from the front edge of the first ceramic layer 15, which probably results in a lengthened bonding wires between the driver 33 and the first ceramic layer 15. The wiring substrate 34 with an optional length may compensate such a lengthened bonding wire. Shortened bonding wire may suppress degradation of the signal quality in high frequencies.

In another situation, when a pitch between the electrodes on the top surface 18 of the first ceramic layer 15 is far different form a pitch between the pads formed on the driver 33, the wiring substrate 34 is provided for a device to convert the pitches. The driver 33 is an integrated circuit (IC) on a silicon wafer, and has a minimum die area to build the necessary circuit therein. Accordingly, the pitch between the pads on the driver 33 is designed to be 100 to 200 µm at most. On the other hand, the electrodes provided in the electrical plug 14 often have the pitch of at least 200 to 400 µm. Moreover, when an optical module has plural channels operating over 10 Gbps and the pads within the driver 33 has the pitch different from the pitch of the electrodes; a time lag becomes large between signals carried on the outermost interconnection and those on the inner interconnection. The wiring substrate 34 adequately compensates the time lag by drawing interconnection on the substrate 34 such that the inner interconnection has a length substantially equal to a length of the outer interconnection.

The arrangement of the TEC 21, the post 26, and the electrical pad 46 of the fourth ceramic layer 44 make the electrical plug 14 to be formed only in the rear end of the body portion 11. Thus, the transmitter optical module with a slimed width may be easily available. Such a module, even when the module installs a plurality of optical sources to realize a total transmission speed of 40 Gbps and/or 100 Gbps, may be installed within a newly proposed transceivers type of CFP2, CFP4, and so on having an optical connector of the LC type.

Figure 8:
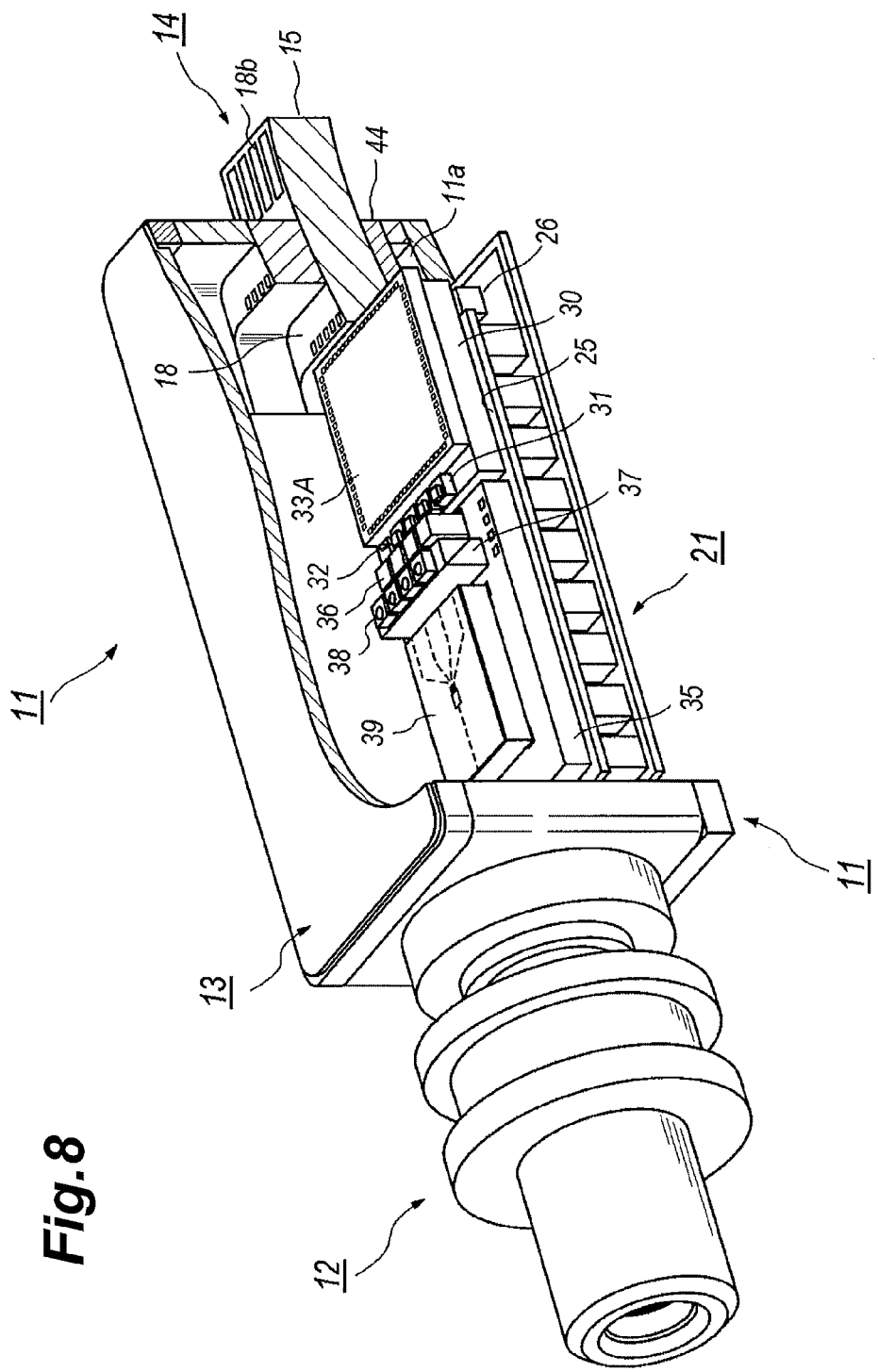
FIG. 8 shows an inside of a transmitter optical module according to another embodiment.
Figure 9:
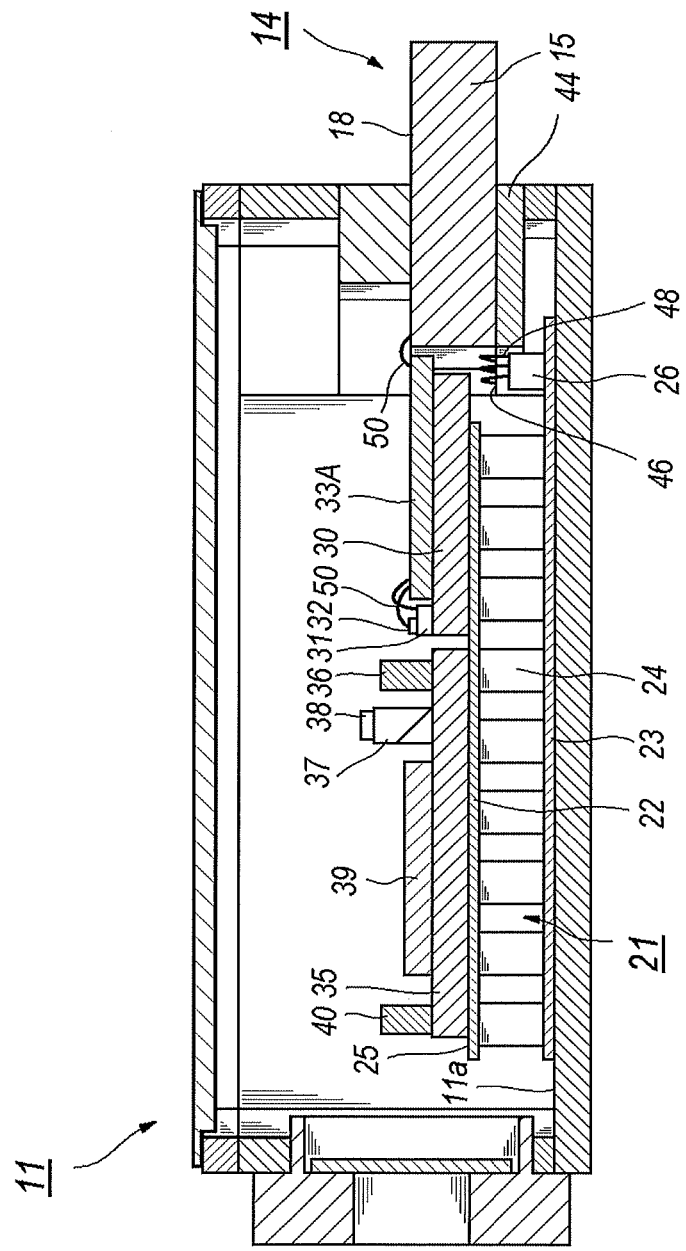
FIG. 9 shows a side cross section of the TEC, electrical elements on the TEC, and the multi-layered ceramics implemented within the transmitter optical module shown in FIG. 8.

FIGS. 8 and 9 show another embodiment, where the transmitter optical module shown in FIGS. 8 and 9 removes the wiring substrate 34 provided on the first carrier 30 and electrically connecting the interconnection on the first ceramic layer 15 to the driver 33A. When the pads formed within the driver 33A have a relatively wider pitch substantially equal to the pitch of the electrodes 18b on the first ceramic layer 18, because the driver 33 integrates supplemental circuit therein and resultantly the die area inevitably becomes large, the transmitter module 10 may remove the wiring substrate 34. The embodiment shown in FIG. 9 sets the rear end of driver 33A close to the front edge of the first ceramic layer 15. The arrangement shown in FIGS. 8 and 9 removes the bonding wire 50 connecting the interconnection provided on the wiring substrate 34 and the driver 33A, which suppresses the degradation due to the existence of this bonding wire.

In the foregoing detailed description, the transmitter optical module of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:
1. A transmitter optical module, comprising:
   a semiconductor laser diode (LD) to emit light with a specific wavelength;
   a thermo-electric-controller (TEC) to control a temperature of the (LD), the TEC including a bottom plate and a post provided on the bottom plate; and
   a body portion configured to enclose the LD and the TEC therein hermetically, the body portion including an electrical plug made of multi-layered ceramics including a lowermost layer providing an electrical pad on a top surface thereof exposed within the body portion, the electrical pad supplying a current to the TEC through the post,
   wherein the post and the electrical pad are configured in side-by-side arrangement and electrically connected with a bonding wire,
   wherein the multi-layered ceramics of the electrical plug further includes a first ceramic layer providing an interconnection electrically connecting an inside of the body portion to an outside thereof, the interconnection of the first layer providing an electrical pad in an end outside of the body portion.

2. The transmitter optical module of claim 1,
wherein the bottom plate of the TEC is slipped under the lowermost layer of the multi-layered ceramics of the electrical plug.

3. The transmitter optical module of claim 1,
wherein the post on the bottom plate of the TEC has a level lower than a level of the top surface of the lowermost layer exposed within the body portion.

4. The transmitter optical module of claim 1,
wherein the first ceramic layer provides interconnections in a top surface and a back surface thereof, the electric pad on the top surface of the lowermost ceramic layer exposed within the body portion being electrically connected to the interconnection in the back surface of the first ceramic layer.

5. The transmitter optical module of claim 1,
wherein the bonding wire has a top level lower than a top level of the TEC.

6. A transmitter optical module, comprising:
a plurality of laser diodes (LDs) each emitting light having wavelengths different from each other;
a thermo-electric-controller (TEC) to control a temperature of the LDs, the TEC including a bottom plate and a post provided on the bottom plate;
a body portion configured to enclose the LDs and the TEC therein hermetically, the body portion including an electrical plug made of multi-layered ceramics including an electrical pad that supplies a current to the TEC through the post, the electrical pad being arranged side-by-side with respect to the post of the TEC;
a driver for driving the LDs electrically; and
an optical multiplexer that multiplexes the light emitted from the LDs,
wherein the LDs and the driver are installed on the IBC through a first carrier, and the optical multiplexer is installed on the TEC through a second carrier different from the first carrier.

7. The transmitter optical module of claim 6,
further including a wiring substrate provided on the first carrier, the wiring substrate providing an interconnection electrically connected to the driver.

8. The transmitter optical module of claim 7,
wherein the wiring substrate extends outwardly from an edge of the first carrier to the electrical plug.

9. The transmitter optical module of claim 6,
wherein the TEC provides a top plate, the first carrier extending outwardly from an edge of a top plate of the TEC toward the plug.

10. The transmitter optical module of claim 6,
wherein the multi-layered ceramics of the electrical plug includes a lowermost layer and a first ceramic layer on the lowermost layer, the electrical pad being provided on a top surface of a portion of the lowermost layer exposed from the first ceramic layer, and
wherein the first ceramic layer provides an interconnection electrically connecting an inside of the body portion to an outside thereof, the interconnection of the first ceramic layer providing an electrical pad in an end outside of the body portion.

11. The transmitter optical module of claim 10,
wherein the first ceramic layer forms exposed areas in respective sides of the lowermost layer by exposing the top surface of the lowermost ceramic layer, and
wherein the post provided on the bottom plate of the TEC is put between the exposed areas in the respective sides of the top surface of the lowermost ceramic layer exposed by the first ceramic layer.

12. The transmitter optical module of claim 6,
wherein the bonding wire has a top level lower than a top level of the TEC.

13. A transmitter optical module, comprising:
a semiconductor laser diode (LD) configured to emit light with a specific wavelength;
a thermo-electric-controller (TEC) configured to control a temperature of the LD, the TEC including a bottom plate and a post provided on the bottom plate thereof;
a body portion configured to enclose the LD and the TEC therein hermetically, the body portion including an electrical plug made of multi-layered ceramics including an electrical pad that supplies a current to the TEC through the post; and
a coupling portion assembled with one side of the body portion opposite to a side where the electrical plug is formed,
wherein the post and the pad are configured in side-by-side arrangement and electrically connected with a bonding wire, and
wherein the body portion provides no electrical structures in both sides connecting the side where the coupling portion is assembled to the side where the electrical plug is formed.

* * * * *